(12) United States Patent
Ono et al.

(10) Patent No.: US 7,267,858 B2
(45) Date of Patent: Sep. 11, 2007

(54) PACKAGING MATERIAL FOR AND PACKAGED PRODUCT OF MEDICAL SUPPLIES AND THE LIKE

(75) Inventors: Saichi Ono, Tokyo (JP); Shinichi Hirakawa, Osaka (JP); Yoichiro Yotsuya, Osaka (JP); Hirofumi Okada, Osaka (JP)

(73) Assignee: Kureha Corporation, Tokyo (JP)

( * ) Notice: Subject to any disclaimer, the term of this patent is extended or adjusted under 35 U.S.C. 154(b) by 292 days.

(21) Appl. No.: 10/869,849

(22) Filed: Jun. 18, 2004

(65) Prior Publication Data

US 2005/0013953 A1    Jan. 20, 2005

(30) Foreign Application Priority Data

Jun. 20, 2003    (JP)    ............................. 2003/177334

(51) Int. Cl.
*B32B 27/08* (2006.01)
*B32B 27/32* (2006.01)
*B32B 27/36* (2006.01)
*B32B 27/10* (2006.01)
*B32B 27/34* (2006.01)
*B65D 30/02* (2006.01)

(52) U.S. Cl. .................... 428/35.7; 428/35.9; 428/36.6; 428/36.7; 428/34.3; 428/349; 428/483

(58) Field of Classification Search ............... 428/35.7, 428/35.9, 36.6, 36.7, 34.3, 349, 483
See application file for complete search history.

(56) References Cited

U.S. PATENT DOCUMENTS

| | | | | | |
|---|---|---|---|---|---|
| 4,778,698 | A | * | 10/1988 | Ou-Yang | .................... 428/34.4 |
| 5,043,376 | A | * | 8/1991 | Sharma et al. | .............. 524/376 |
| 5,391,429 | A | * | 2/1995 | Otani et al. | .................. 428/327 |
| 5,869,567 | A | * | 2/1999 | Fujita et al. | ................. 524/608 |
| 5,888,648 | A | * | 3/1999 | Donovan et al. | ............ 428/349 |
| 6,521,679 | B1 | * | 2/2003 | Okada et al. | ............... 523/336 |
| 2004/0052993 | A1 | * | 3/2004 | Dawes | ....................... 428/35.7 |

FOREIGN PATENT DOCUMENTS

| | | |
|---|---|---|
| JP | 57-69043 | 4/1982 |
| WO | WO9619333 A1 * | 6/1996 |

* cited by examiner

*Primary Examiner*—Jennifer McNeil
*Assistant Examiner*—Christopher P Bruenjes
(74) *Attorney, Agent, or Firm*—Wenderoth, Lind & Ponack, L.L.P.

(57) ABSTRACT

A packaging material is formed by a substrate, and an inner sealing layer comprising a polyolefin layer and an aqueous dispersion-type polyester resin layer successively disposed on the substrate. The aqueous dispersion-type amorphous polyester resin layer contains an anionic surfactant or an amphoteric surfactant and is substantially free from an organic solvent having a boiling point of at most 100° C. The thus-formed packaging material is excellent in aroma-retentivity, aroma non-adsorptivity, particulate non-adhesion, low residual solvent and sealability. The packaging material is also free from environmental problem and is therefore suitable as a packaging material for particulate medical supplies and health foodstuff.

23 Claims, No Drawings

PACKAGING MATERIAL FOR AND PACKAGED PRODUCT OF MEDICAL SUPPLIES AND THE LIKE

FIELD OF THE INVENTION AND RELATED ART

The present invention relates to a packaging material in the form of a bag suitable for packaging powdery, granular or particulate medical supplies (inclusive of drugs, medicine, and cosmetics) and health foodstuff, and also a packaged product of such medical supplies and the like as content materials.

Packaging materials for powdery, granular or particulate (hereinafter inclusively referred to as "particulate") medical supplies and health foods require special properties and care compared with packaging materials for other content materials, such as sundries and general foods. The special properties and care include no adverse effects against environments at the time of disposal thereof in addition to packaging properties adapted to storage of particulate content materials. This is because users of medical supplies and health foods are generally also sensitive to such adverse effects against environments at disposal of the packaging materials.

More specifically, a packaging material providing a packaging bag for particulate medical supplies and health foods (hereinafter represented by "medical supplies") generally has a laminate structure including a substrate comprising a base layer comprising paper, cellophane, polyester, nylon, polypropylene, etc., and a layer of aluminum foil or gas barrier film disposed on the base layer, and further a thermoplastic sealing resin layer formed on the substrate. The packaging material is formed into a various form of bag, which is filled with a content material and then again heat-sealed at its inlet mouth to provide a bag-packaged product.

Such a packaging material for particulate medical supplies is required to have various properties, inclusive of: freeness from giving an odor to the enclosed content material, as a matter of course; a property of not impairing aroma of the content material where the content material has aroma by containing a volatile drug, a flavor or a refrigerant (=aroma-retentivity); a property of not reducing such aroma (=aroma non-adsorptivity); and a low residual solvent, to the utmost degree. The packaging material is further required to satisfy properties of not leaving the particulate content material therein due to physical attachment of the particles to the inner side thereof (=particulate non-adhesion); heat-sealability, particularly a property of providing a good seal even in the presence of some particulate content material at the place of seal (=foreign matter sealability); etc. Polyolefins (inclusive of polyethylene, polypropylene, ethylene-propylene copolymer and ethylene-vinyl acetate copolymer) most frequently used as a heat sealing material for packaging materials, generally leave a problem with respect to the aroma non-adsorptivity, and also a problem with respect to the aroma-retentivity because it contains an anti-blocking agent or a lubricant for the film formation and also an antioxidant, etc., added thereto. Polyester resins are known to be excellent in the aroma-retentivity and the aroma non-adsorptivity (e.g., as disclosed in "Shokuhin Hozon Binran (Food Preservation Handbook)", published from K.K. Creative Japan (Jun. 12, 1992)), but an amorphous polyester resin of solvent type is problematic because it leaves much residual solvent.

A packaging material having a laminate structure of a polyolefin layer and a vinylidene chloride resin layer successively laminated on the substrate has been successfully used as a packaging material for particulate medical supplies because it is good in all of the above-mentioned aroma-retentivity, aroma non-adsorptivity, low residual solvent, particulate non-adhesion and heat-sealability. However, as for the vinylidene chloride resin which is one of chlorine-containing resins, there are increasing demands for replacement thereof.

SUMMARY OF THE INVENTION

Accordingly, a principal object of the present invention is to provide a packaging material which is excellent in the above-mentioned properties required of a packaging material for particulate medical supplies, etc., such as aroma-retentivity, aroma non-adsorptivity, particulate non-adhesion, low residual solvent and heat-sealability, and is also free from environmental problems.

According to the present invention, there is provided a packaging material, comprising: a substrate, and an inner sealing layer comprising a polyolefin layer and an aqueous dispersion-type polyester resin layer successively disposed on the substrate, wherein said aqueous dispersion-type amorphous polyester resin layer contains an anionic surfactant or an amphoteric surfactant and is substantially free from an organic solvent having a boiling point of at most 100° C.

The packaging material of the present invention is most characterized in that for the surface layer heat-sealant, the use of a solvent-type amorphous polyester resin as a conventional heat-sealant is obviated, but an aqueous dispersion-type amorphous polyester resin is used by substantially removing a low-boiling organic solvent having a boiling point of at most 100° C. while using an anionic surfactant or an amphoteric surfactant added thereto instead of the organic solvent. The anionic or amphoteric surfactant has not only an effect of suppressing the lowering in dispersibility of the amorphous polyester resin in an aqueous dispersion liquid due to the removal of a low-boiling organic solvent to retain the coating applicability of the amorphous polyester resin aqueous dispersion liquid but also a function of ensuring the particulate non-adhesion property.

DESCRIPTION OF PREFERRED EMBODIMENTS (Substrate)

The substrate of the packaging material according to the present invention may have a similar material structure as those used in conventional packaging materials for medical supplies. More specifically, the substrate may have a structure including an optionally printed base layer of paper, cellophane or a film of plastic, such as polyester, nylon or polypropylene, and an optional barrier layer applied thereon of an aluminum foil or a barrier film, such as ethylene-vinyl alcohol copolymer film, a vapor-deposited film of an inorganic material, such as silica, alumina or aluminum, or a polypropylene film. The barrier layer may preferably exhibit barrier characteristics, such as an oxygen permeability of at most 50 ml/m$^2$.day.MPa (according to JIS K7126B) and/or a water vapor permeability of at most 5 g/m$^2$.day (according to JIS K7129B).

(Polyolefin Layer)

On the barrier layer of such a substrate as described above, a polyolefin layer is laminated. Examples of the polyolefin may include: polyethylene, polypropylene and ethylene-vinyl acetate copolymers having a vinyl acetate content of at most 15 wt. %. Among these, low-density polyethylene having a density of 0.915-0.925 g/cm³ is preferably used. The polyolefin layer may suitably have a thickness of ca. 20-50 μm. A thickness below 20 μm is liable to result in a lower sealing strength (as measured according to a method described hereinafter). A thickness in excess of 50 μm is not expected to provide a further increased sealing strength and becomes economically disadvantageous. For the lamination coating of the polyolefin layer on the substrate, it is also possible to form an anchor coating layer of, e.g., polyurethane-based, polyethyleneimine-based and polybutadiene-based adhesives.

(Aqueous Dispersion-Type Amorphous Polyester Resin Layer)

According to the present invention, the polyolefin layer optionally coated with an anchor coating layer of, e.g., a polyurethane-based adhesive, is coated with an aqueous dispersion-type amorphous polyester resin layer by application of an aqueous dispersion liquid of amorphous polyester resin.

An amorphous polyester resin is generally a copolyester formed by copolymerization of a polybasic acid having at least two carboxyl groups (or anhydride thereof) and a polyhydric alcohol having at least two hydroxyl groups with the proviso that at least one of the polybasic acid and/or the polyhydric alcohol is used in two or more species. It is desirable to use an amorphous polyester resin showing substantially no heat absorption peak attributable to crystal melting point when subjected to heating at rate of 10° C./min. in a nitrogen atmosphere by using a differential scanning calorimeter (DSC), but it is possible to use one showing a heat-absorption peak enthalpy (crystal melting enthalpy ΔHc) of ca. 10 J/g or below. Examples of the polybasic acid may include: aromatic dicarboxylic acids, such as terephthalic acid, isophthalic acid and naphthalenedicarboxylic acid; aliphatic dicarboxylic acid, such as succinic acid and anhydride thereof and adipic acid; and optionally added three or more-functional polybasic acids, such as trimellitic acid, pyromellitic acids and anhydrides of these. It is preferred that at least 70 mol % of the polybasic acid comprises an aromatic dicarboxylic acid, including at least 65 mol. % of terephthalic acid.

Examples of the polyhydric alcohol may include: aliphatic glycols having 2-10 carbon atoms, such as ethylene glycol, 1,2-propylene glycol, 1,3-propanediol, and neopentyl glycol; alicyclic glycols, such as 1,4-cyclohexanebimethanol; and optionally three or more functional polyhydric alcohols, such as glycerin, trimethylolpropane and pentaerythritol. It is preferred that at least 65 mol % of the polyhydric alcohol comprises ethylene glycol and/or neopentyl glycol.

At least one of the above-mentioned polybasic acid and/or polyhydric alcohol is used in two or more species while controlling their compositional ratios and degree of polycondensation, thereby providing an amorphous polyester resin suitably used in the present invention, which has a glass transition temperature (Tg) of −20° C. to 80° C., a polystyrene-equivalent number-average molecular weight (Mn) of 5000 to 25000 as measured by GPC (gel permeation chromatography) and an acid value of 8 to 40 mgKOH/g. Generally, a high molecular weight and a low Tg are preferred in order to provide an increased heat-seal strength, whereas a low molecular weight and a high Tg are preferred from the viewpoint of anti-blocking of the heat-sealing layer. In order to harmonize the heat-seal strength and the anti-blocking property, it is preferred to use a combination of an amorphous polyester resin having a Tg of at least 40° C. and an amorphous polyester resin having a Tg below 40° C.

The above-mentioned amorphous polyester resin is used in the form of an aqueous dispersion liquid thereof. For the purpose of neutralizing the polyester resin to improve the water-dispersibility thereof, it is preferred to add a basic compound, such as N,N-diethanolamine, triethylamine or ammonia, and it is also possible to optionally add a compound functioning as a protective colloid, such as polyvinyl alcohol or carboxymethyl cellulose, and/or an organic solvent, selected from lower alcohols functioning as a plasticizer for the polyester resin, such as ethanol, isopropanol and butanol; ketones, such as methyl ethyl ketone; esters, such as ethyl acetate; and ethylene glycol monoalkyl ethers (so-called cellosolves). Particularly, an organic solvent having a boiling point of 150° C. or below has a high ability of plasticizing the polyester resin and is preferred for improving the water dispersibility of a high-Tg polyester resin used for enhancing the anti-blocking property of the resultant heat-sealing layer, whereas the remaining thereof as a residual solvent in the heat-sealing layer is unsuitable for the packaging material for medical supplies according to the present invention. Accordingly, such an organic solvent having a boiling point of at most 150° C., especially at most 100° C., even if used for improving the water-dispersibility, should preferably be substantially removed by, e.g., azeotropic distillation with water, prior to the use of the aqueous dispersion liquid for preparation of the packaging material.

Accordingly, the condition that the aqueous dispersion-type amorphous polyester resin layer is substantially free from the organic solvent having a boiling point of at most 100° C. in the present invention, is preferably satisfied by a residual solvent of below 8 mg/m², more preferably below 5 mg/m², when a resultant packaging material including a heat-sealing layer is subjected to a residual solvent measurement which is described hereinafter.

For the preparation of an aqueous dispersion liquid of the amorphous polyester resin, it is important to comminute or finely pulverize the amorphous polyester resin. The comminution may for example be effected by jet pulverization treatment, wherein a fluid or fluids including the above ingredients is/are caused to flow or be jetted under a high pressure and high speed condition to comminute the resin particles therein by collision of the fluid(s) to each other or to an impinging plate means, etc.

For the preparation of an aqueous dispersion liquid of amorphous polyester resin, there may be applied techniques disclosed in e.g., JP-A 9-296100, JP-A 11-61035, JP-A 2000-26709 and JP-A 2000-313793 including a summary thereof as described above.

The aqueous dispersion liquid of amorphous polyester resin may suitably have a solid matter content on the order of 20 to 50 wt. %.

According to the present invention, the aqueous dispersion liquid of amorphous polyester resin is caused to contain an anionic surfactant or an amphoteric surfactant. The anionic surfactant or amphoteric surfactant contributes to not only the improvement in water dispersibility and coating applicability onto the polyolefin layer of the amorphous polyester resin but also the formation of a heat-sealing layer having a good particulate non-adhesion property by functioning as a kind of antistatic agent. A cationic or a nonionic surfactant has a poor miscibility with the aqueous dispersion liquid of amorphous polyester resin, so that the resultant aqueous dispersion liquid is liable to cause gelling or shows a poor coating applicability onto the polyolefin layer, thus failing to form a smooth amorphous polyester resin layer.

Also in view of the adaptability to medical supplies, alkyl sulfate-type and polyoxyethylene alkyl ether acetate-type anionic surfactants, and betain-type amphoteric surfactants, are preferred, and among these, anionic surfactants giving a good particulate non-adhesion property are further preferred.

The anionic surfactant or amphoteric surfactant may preferably be used in a proportion of 0.2 to 10.0 wt. %, particularly 2.5 to 5.4 wt. % (based on its solid matter) with respect to the solid matter content in the aqueous dispersion liquid of amorphous polyester resin. Below 2 wt. %, the addition effect is scarce, and the use in excess of 10 wt. % is liable to lower the resultant seal strength.

Other agents can be added to the aqueous dispersion liquid of amorphous polyester resin in addition to the surfactant. Examples of such other agents may include: anti-blocking agents, slip agents (lubricants), etc.

The amorphous polyester resin layer may preferably be formed on the polyolefin layer at a coating rate of 1 to 7 g/m$^2$, particularly 3 to 4 g/m$^2$ based on solid. Below 1 g/m$^2$, the resultant seal strength is liable to be unstable, and above 7 g/m$^2$, the resultant amorphous polyester resin layer is liable to have an increased residual solvent content due to a lowering in drying efficiency. The application of the aqueous dispersion liquid of amorphous polyester resin may be performed by any arbitrary method as far as it allows the control of a uniform coating amount.

The amorphous polyester resin layer after the application as an aqueous dispersion liquid may be dried at a temperature of ca. 80 to 130° C. The drying at a temperature of 135° C. or above is liable to cause fusion-sticking of ears of the packaging material, thus being unsuitable in some cases.

(Anchoring Treatment)

Prior to the coating with the aqueous dispersion liquid of amorphous polyester resin, the polyolefin layer may preferably be subjected to an anchoring treatment, such as a corona treatment or the coating with an anchor coating agent such as two part-type polyurethane, so as to improve the coatability with the aqueous dispersion liquid. The anchor coating agent may suitably be applied at ca. 0.2 to 0.7 g/m$^2$ (as solid).

(Heat Sealing)

The packaging material prepared in the above-described manner may be used for provision of bag-shaped products through sequential steps of heat-sealing into various shapes of bags, filling with a content material and further heat-sealing of the inlets of the bags.

The heat sealing may generally be performed at a temperature of 120 to 180° C. under application of a pressure of ca. 0.1 to 0.3 MPa, so as to provide a seal strength of preferably at least 5N/15 mm, more preferably 8N/15 mm or higher. The heat-sealing layer based on the combination of the polyolefin layer and the amorphous polyester resin layer is characterized in that the resultant seal strength exhibits a smaller degree of lowering with time compared with the conventional heat-sealing layer based on the combination of a polyolefin layer and a vinylidene chloride resin layer.

Examples of the laminate layer structure of the packaging material according to the present invention are shown below with some component materials represented by their abbreviations (explained after) but these are not exhaustive.

Ex.1) PET(12)/AC/PE(15)/AL(9)/AC/PE(40)/AC/A.PET(3)

Ex.2) glassine(30.5)/AC/PE(15)/AL(7)/AC/PE(40)/AC/A.PET(3)

Ex.3) plain cellophane(30)/AC/PE(15)/AL(9)/AC/PE(40)/AC/A.PET(3)

Ex.4) PET(12)/DL/EVOH(12)/AC/PE(40)/AC/A.PET(3)

Ex.5) PET(12)/DL/OPP(20)/AC/PE(40)/AC/A.PET(3)

Ex.6) NY(15)/AC/PE(15)/AL(9)/AC/PE(40)/AC/A.PET(3)

Ex.7) PET(12)/DL/silica-deposited PET(12)/AC/PE(40)/AC/A.PET(3)

(Abbreviations for the Layer Component Materials)

PET: polyester film,

AC: anchor coating,

AL: aluminum foil,

PE: polyethylene,

EVOH: ethylene-vinyl alcohol copolymer film,

DL: dry lamination adhesive,

OPP: biaxially stretched polypropylene film,

NY: biaxially stretched nylon film,

A.PET: amorphous polyester resin.

The numerals in parentheses following the component materials represent a layer thickness (μm) of the materials except that the same represents a basis weight of g/m$^2$ for glassine, A.PET(amorphous polyester resin layer) and plain cellophane.

(Medical Supplies)

As described hereinbefore, the packaging material of the present invention is particularly adapted to packaging of particulate medical supplies (inclusive of drugs, medicine, and cosmetics) and health foodstuff. The packaging material can be applicable to a pellet-form product, etc., of ca. 5 mm or so in diameter (e.g., chlorella pellets) but is particularly suitable for packaging particulate materials of at most 3 mm in diameter and is most suitable for packaging of spherical adsorptive carbon particles of at most 0.5 mm in diameter, which are liable to exhibit noticeable adhesion to the packaging material.

PRODUCTION EXAMPLE

The production process of the packaging material according to the present invention basically includes: a step of laminating a polyolefin layer on a substrate, and a step of coating the polyolefin layer with an aqueous dispersion-type amorphous polyester resin layer. The aqueous dispersion-type amorphous polyester resin layer contains an anionic surfactant or an amphoteric surfactant and is substantially free from an organic solvent having a boiling point of at most 100° C.

Hereinbelow, an example process for producing a stick-form packaging material for spherical adsorptive carbon as a representative example of the packaging material, but this is of course not a limitative example.

First, a corona-treated surface of a 12 μm-thick base polyester film is printed with information necessary for indicating the product by a gravure rotary press. At this time, in addition to an indication of the content material (product), an indication of a cut line for indicating the part for opening of a stick-form package is also printed.

Then, the thus-printed polyester film (12 μm) is perforated along the cut line for facilitating the opening of the stick-form package.

The printed and perforated polyester film (12 μm) and a 9 μm-thick aluminum foil as a barrier material are applied to each other with a melted 15 μm-thick polyethylene layer and simultaneously the opposite face of the aluminum foil is coated with a melted 40 μm-thick polyethylene layer, by means of a tandem-type extrusion laminator, to form a composite material (called hereinafter a "stock sheet"). (In this instance, the printed polyester film and the aluminum foil have been coated in advance with an anchor coating agent for promoting the adhesion therebetween.) Then, the polyethylene coating layer is subjected to a surface corona discharge treatment to enhance the wettability.

The thus-prepared stock sheet is held for ca. 24 hours in an environment of 35-40° C. for aging to cure the anchor coating agent.

Then, the polyethylene-coated (and corona discharge-treated) face of the stock sheet is coated with an anchor coating layer and then with an aqueous dispersion liquid of amorphous polyester resin containing a surfactant and silica added thereto at a rate of ca. 3 g/m$^2$, and dried.

The stock sheet is again kept for ca. 24 hours in an environment of 35-40° C. for aging to cure the anchor coating agent, subjected to inspection and cutting, and wound up to obtain a roll of packaging material.

EXAMPLES

Hereinbelow, the present invention will be described more specifically based on Examples and Comparative Examples. The surface seal layer-forming coating liquids and the resultant packaging materials were evaluated with respect to the following items.

(1) Coating Applicability

The surface polyethylene layer of a stock sheet is coated with a polyurethane-based anchor coating agent at a rate of ca. 0.5 g/m$^2$ (as solid), and a prepared sample of amorphous polyester resin aqueous dispersion liquid is uniformly applied thereon, to evaluate the coating applicability of the sample dispersion liquid by observation with eyes according to the following standard.

A: Provides a uniform coating.

B: Some coating irregularity is observed but a coating film can be formed.

C: The coating liquid is repelled to fail in coating film formation.

(2) Seal Strength

Heat sealing is performed by using a sample packaging material under the conditions of: a sealing temperature of 150° C., a pressure of 0.2 MPa and 1 second by using a sealing machine ("TP-701-B", made by Tester Sangyo K.K.). The resultant seal is subjected to T-shape peeling test at a peeling speed of 300 mm/min. to measure a peeling strength as a seal strength, which is then evaluated according to the following standard.

A: At least 8N/15 mm.

B: At least 5N/15 mm and below 8N/15 mm.

C: Below 5N/15 mm.

(3) Residual Solvent (Content)

An areal portion of 0.2 m$^2$ is cut from a sample packaging material and slit in a width of 5 mm. The slit sample is placed in a 500 ml-Erlenmeyer flask, and the inner space thereof is replaced by nitrogen gas blown thereinto. The Erlenmeyer flask is plugged and warmed for 30 min. in a thermostatic chamber held at 80° C. Then, 1 ml of the gas inside the Erlenmeyer flask is sampled and analyzed by gas chromatography to measure the amount of solvent evaporated from the packaging material and calculate the amount of solvent per unit area (mg/m$^2$) as a residual solvent amount, which is evaluated according to the following standard:

A: Below 5 mg/m$^2$.

B: At least 5 mg/m$^2$ and below 8 mg/m$^2$.

C: At least 8 mg/m$^2$.

(4) Smell (Sensory Test)

A sample packaging material is formed by sealing into a tetrahedral empty bag and placed in a thermostatic chamber at 40° C. for ca. 1 day. Then, a corner of the tetrahedral bag is cut off, and the substance emitted from inside the tetrahedral bag is smelled and evaluated according to the following standard.

A: Almost no smell.

B: Slight smell is sensed, but not an unpleasant odor. Below a tolerable limit.

C: Not an unpleasant smell, but lightly smells.

D: Unpleasant irritating odor, not tolerable.

Smell is caused by various factors, i.e., attributable to the resin per se or the additive, processing conditions, and species and amount of residual solvent, etc. As for the species of residual solvent, toluene and methyl ethyl ketone, for example, emit irritating smell which judged to be unpleasant odor, even if they remain in a slight amount; and ethyl acetate and ethyl alcohol are judged to be acceptable light smell, even if they remain in a small amount. In the case of a substantial amount of residual solvent, even ethyl acetate or ethyl alcohol is judged to be an irritating smell.

(5) Anti-Blocking Property

A sample packaging material obtained by application of an aqueous dispersion liquid of amorphous polyester resin is cut into 5 to 10 sample sheets each measuring 100 mm×100 mm. The sample sheets are stacked so that the faces and backs alternate each other, and the stack is placed under a load of 10 kg and left standing for 24 hours in an environment of 40° C. Then, the stacked sheets are peeled one by one to evaluate the anti-blocking property according to the following standard.

A: The peeling can be performed with no resistance.

C: The peeling is accompanied with a resistance or cannot be performed.

(6) Particulate Non-Adhesion Property (Residual Particle Percentage)

Each packaging material formed into a tubular bag giving a planar width of ca. 30 mm is formed by heat sealing, filled with 0.2 to 0.4 mm-dia. spherical adsorptive carbon particles ("KREMEZIN particles", made by Kureha Chemical Industry Co., Ltd.) as an example of substantially adherent medicine at an elevated temperature of ca. 60° C. and heat-sealed at ca. 90 mm intervals to form rows of portion bag packages each having a planar shape of ca. 90 mm in length and ca. 30 mm in width and each containing ca. 2 g of the carbon particles. (Further details of the above preparation process are described in JP-A6-190021.) Then, each portion bag package is opened at its one shorter-side end, and the content particles are discharged through the opened end directed downwards. In this state, a side face of the portion bag is filliped twice with a finger for promoting the discharge of the content particles. Thereafter, the weight of the particles remaining in the portion bag is measured and divided by the original weight (=ca. 2 g) to calculate a residual particle percentage, based on which the particulate non-adhesion property is evaluated according to the following standard:

A: Below 1.0% (of residual particle percentage).

B: 1.0% to 2.0%.

C: Above 2.0%.

Example 1

Onto one surface of a 12 μm-thick polyethylene terephthalate film which had been printed on the other surface and perforated in a line proximate to a place to be sealed, an anchor coating agent was applied at a rate of ca. 0.5 g/m², and polyethylene was melt-applied in a thickness of 15 μm, followed by application thereto of a 9 μm-thick aluminum foil. Further, a two part-type polyurethane-based anchor coating agent was applied at ca. 0.5 g/m², and a 40 μm-thick polyethylene layer was applied by melt-coating thereon to form a foundation to be coated with a surface sealing layer.

An aqueous dispersion liquid containing 30 wt. % (as solid) of amorphous polyester resin of Tg=70° C. and Mn=9000 and substantially free from organic solvent having a boiling point of at most 100° C. ("ELITEL KZA-507 IS" made by Unitica K.K.; obtained by substantially removing isopropanol (IPA) by azeotropic distillation with water from "ELITEL KZA-5071" containing 18 wt. % of IPA) and an aqueous dispersion liquid ("ELITEL KZM8701" made by Unitica K.K.) containing 30 wt. % (as solid) of amorphous polyester resin of Tg=18° C. and Mn=11000, were blended at a weight ratio of 2:1, followed by addition thereto of an anionic surfactant aqueous solution ("EMAL 2F", made by Kao K.K.) containing 30 wt. % of solid matter including sodium lauryl sulfate in an amount corresponding to 3 wt. % of the amorphous polyester resin and 3 wt. % of silica fine powder as a lubricant, to obtain an aqueous dispersion liquid of amorphous polyester resin.

The above-formed foundation surface on the substrate was subjected to corona discharge treatment, then coated with a ca. 0.5 g/m² of two part polyurethane-type anchor coating layer, and further coated with the above-prepared aqueous dispersion liquid of amorphous polyester resin, followed by drying at 120° C. for 12 sec., to obtain a packaging material according to the present invention. In this instance, the aqueous dispersion liquid of amorphous polyester resin exhibited a good coating applicability.

The above-prepared packaging material having an amorphous polyester resin layer as the surface sealing layer exhibited a seal strength of 15.4 N/15 mm, a residual solvent of 1.4 mg/m², no smell, a good anti-blocking property, and a good particulate non-adhesion property as represented by a residual particle percentage of 0.3%, thus exhibiting no problem at all with respect to any of the evaluation items.

Comparative Example 1

A packaging material was prepared in the same manner as in Example 1 except that the surface sealing layer was formed as a 7 g/m²-coating layer of vinylidene chloride resin (PVDC) ("KREHALON LA-412", made by Kureha Chemical Industry Co., Ltd.)

The seal strengths of the packaging materials obtained by the above Example 1 and Comparative Example 1 were measured with time. The results are shown in Table 1 below.

TABLE 1

| | Change with time of seal strength (N/15 mm) | |
|---|---|---|
| Surface sealing layer | Example 1 Amorphous polyester resin | Comparative Example 1 PVDC |
| Immediately after sealing | 15.4 N/15 mm | 22 N/15 mm |
| After  1 day | 14.3 N/15 mm | 5 N/15 mm |
| 3 days | 12.9 N/15 mm | 5 N/15 mm |
| 7 days | 11.3 N/15 mm | 6 N/15 mm |
| 1 month | 11.2 N/15 mm | — N/15 mm |

From the results shown in the above Table 1, it is understood that the packaging material of the present invention having a surface sealing layer of amorphous polyester resin (Example 1) was substantially relieved from the lowering with time of seal strength caused by progress of crystallization of vinylidene chloride resin as observed in the packaging material of Comparative Example 1.

The results of evaluation of the packaging material of Example 1 with respect to the above-mentioned evaluation items are inclusively shown in Table 2 appearing hereinafter together with those of packaging materials obtained in the following Comparative Example, Reference Example and Examples.

Comparative Example 2

A packaging material was prepared in a similar manner as in Example 1 except for using an aqueous dispersion liquid of amorphous polyester resin prepared in the same manner as in Example 1 except for omitting the sodium lauryl sulfate. The aqueous dispersion liquid exhibited poor coating applicability to fail in providing a polyester coating layer, so that no evaluation of packaging material was possible.

Reference Example 1

A packaging material was prepared in a similar manner as in Example 1 except for using an aqueous dispersion liquid of amorphous polyester resin prepared in the same manner as in Example 1 except for reducing the amount of sodium lauryl sulfate to 1 wt. % of the amorphous polyester resin (solid). The aqueous dispersion liquid exhibited poor coating applicability to fail in providing a polyester coating layer, so that no evaluation of packaging material was possible.

Example 2

A packaging material was prepared in the same manner as in Example 1 except for using an aqueous dispersion liquid obtained by changing the amount of sodium lauryl sulfate to 2 wt. % of the amorphous polyester resin (solid). The aqueous dispersion liquid provided a polyester layer though it was accompanied with some coating irregularity. The packaging material exhibited a seal strength of 21 N/15 mm, a residual solvent of 1.2 mg/m$^2$, no smell, a good anti-blocking property, and a residual particle percentage of 1.5%. The coating applicability of the aqueous dispersion liquid and the particulate non-adhesion property of the packaging material were within a tolerable limit, and no problem was observed with respect to the other evaluation items, so that the overall evaluation was "good" as shown in Table 2.

Example 3

A packaging material was prepared in the same manner as in Example 1 except for using an aqueous dispersion liquid obtained by changing the amount of sodium lauryl sulfate to 4 wt. % of the amorphous polyester resin (solid). The aqueous dispersion liquid exhibited a good coating applicability. The packaging material exhibited a seal strength of 15N/15 mm, a residual solvent of 0.9 mg/m$^2$, no smell, a good anti-blocking property, and a good particulate non-adhesion property as represented by a residual particle percentage of 0.2%, thus exhibiting no problem at all with respect to any of the evaluation items.

Example 4

A packaging material was prepared in the same manner as in Example 1 except for using an aqueous dispersion liquid obtained by changing the amount of sodium lauryl sulfate to 5 wt. % of the amorphous polyester resin (solid). The aqueous dispersion liquid exhibited a good coating applicability. The packaging material exhibited a seal strength of 15N/15 mm, a residual solvent of 1.5 mg/m$^2$, no smell, a good anti-blocking property, and a residual particle percentage of 0.1%, thus exhibiting no problem at all with respect to any of the evaluation items.

Example 5

A packaging material was prepared in the same manner as in Example 1 except for using an aqueous dispersion liquid obtained by changing the amount of sodium lauryl sulfate to 6 wt. % of the amorphous polyester resin (solid). The aqueous dispersion liquid exhibited a good coating applicability. The packaging material exhibited a seal strength of 7N/15 mm, a residual solvent of 3.0 mg/m$^2$, no smell, a good anti-blocking property, and a residual particle percentage of 0.1%. The seal strength was somewhat lowered but within a tolerable limit, and no problem was observed with respect to the other evaluation items.

Example 6

A packaging material was prepared in the same manner as in Example 1 except for using an aqueous dispersion liquid obtained by changing the amount of sodium lauryl sulfate to 10 wt. % of the amorphous polyester resin (solid). The aqueous dispersion liquid exhibited a good coating applicability. The packaging material exhibited a seal strength of 6N/15 mm, a residual solvent of 4.0 mg/m$^2$, no smell, a good anti-blocking property, and a residual particle percentage of 0.1%. The seal strength was somewhat lowered but within a tolerable limit, and no problems was observed with respect to the other evaluation items.

TABLE 2

The coating applicability of aqueous dispersion liquid and results of evaluation of packaging materials with varying addition amounts of sodium lauryl sulfate (SLS)

| Example | SLS amount (wt. %) | Coating applicability | Packaging material | | | | | |
|---|---|---|---|---|---|---|---|---|
| | | | Seal strength | Residual solvent | Smell | Anti-blocking | Powder non-adhesion | Overall evaluation |
| Comp. 2 | 0 | C | — | — | — | — | — | Not good |
| Ref. 1 | 1 | C | — | — | — | — | — | Not good |
| 1 | 3 | A | A | A | A | A | A | Good |
| 2 | 2 | B | A | A | A | A | B | Good |
| 3 | 4 | A | A | A | A | A | A | Good |
| 4 | 5 | A | A | A | A | A | A | Good |
| 5 | 6 | A | B | A | A | A | A | Good |
| 6 | 10 | A | B | A | A | A | A | Good |

Comparative Example 3

A packaging material was prepared in the same manner as in Example 1 except for using a solution in ethyl acetate containing 30 wt. % of amorphous polyester resin of Tg=65° C. and Mn=18000 instead of the aqueous dispersion liquid of amorphous polyester resin used in Example 1.

The solution exhibited good coating applicability during the preparation of the packaging material. The thus-prepared packaging material exhibited a seal strength of 30N/15 mm, a residual solvent of 230 mg/m$^2$, an unpleasant, irritating and intolerable odor, a good anti-blocking property and a residual particle percentage of 0.9%. Thus, the residual solvent and smell were judge to be at intolerable levels.

The evaluation results are inclusively shown in Table 3 described later together with those of the following Comparative Examples and Examples.

Comparative Example 4

A packaging material was prepared in the same manner as in Example 1 except for using a coating aqueous dispersion liquid obtained in the same manner as in Example 1 except for replacing the high-Tg amorphous polyester resin aqueous dispersion liquid ("ELITEL KZA-5071 S") used in Example 1 with an IPA-water dispersion liquid of the same amorphous polyester resin containing 18 wt. % of IPA ("ELITEL KZA-5071") and also by omitting the anionic surfactant aqueous solution.

The coating liquid exhibited good coating applicability during the packaging material preparation. The resultant packaging material exhibited a seal strength of 18N/15 mm, a residual solvent of 11.4 mg/m², a slight smell, a good anti-blocking property, and a residual particle percentage of 3.0%. The residual solvent and the particle non-adhesion property were at intolerable levels, so that the overall evaluation was "not good" as shown in Table 3.

Comparative Example 5

A packaging material was prepared in the same manner as in Example 1 except for using a coating aqueous dispersion liquid obtained in the same manner as in Example 1 except for replacing the high-Tg amorphous polyester resin aqueous dispersion liquid ("ELITEL KZA-5071 S") used in Example 1 with an IPA-water dispersion liquid of the same amorphous polyester resin containing 18 wt. % of IPA ("ELITEL KZA-5071") and adding the anionic surfactant aqueous solution containing the sodium lauryl sulfate at 1 wt. % with respect to the amorphous polyester resin (as solid).

The coating liquid exhibited good coating applicability during the packaging material preparation. The resultant packaging material exhibited a seal strength of 25N/15 mm, a residual solvent of 10.1 mg/m², a light smell though not unpleasant, a good anti-blocking property, and a residual particle percentage of 1.5%. The residual solvent was at an intolerable level.

Example 7

A packaging material was prepared in the same manner as in Example 1 except for using a coating aqueous dispersion liquid obtained in the same manner as in Example 1 except for changing the ratio of the high-Tg amorphous polyester resin aqueous dispersion liquid ("ELITEL KZA-5071 S") and the low-Tg amorphous polyester resin aqueous dispersion liquid ("ELITEL KZM-8701") from 2:1 to 3:1.

The coating liquid exhibited good coating applicability during the packaging material preparation. The resultant packaging material exhibited a seal strength of 12N/15 mm, a residual solvent of 0.9 mg/m², no smell, a good anti-blocking property, and a residual particle percentage of 0.4%, thus exhibiting no problem at all with respect to any of the evaluation items.

Example 8

A packaging material was prepared in the same manner as in Example 1 except for using a coating aqueous dispersion liquid obtained in the same manner as in Example 1 except for changing the ratio of the high-Tg amorphous polyester resin aqueous dispersion liquid ("ELITEL KZA-5071 S") and the low-Tg amorphous polyester resin aqueous dispersion liquid ("ELITEL KZM-8701") from 2:1 to 4:1.

The coating liquid exhibited good coating applicability during the packaging material preparation. The resultant packaging material exhibited a seal strength of 5N/15 mm, a residual solvent of 1.2 mg/m², no smell, a good anti-blocking property, and a residual particle percentage of 0.5%. The seal strength was lowered but within a tolerable range, and no problem was observed with respect to the other evaluation items.

Example 9

A packaging material was prepared in the same manner as in Example 1 except for using glassine (paper) having a basis weight of 30.5 g/m² as the base layer instead of the 12 μm-thick polyethylene terephthalate film and reducing the thickness of the lower polyethylene layer from 40 μm to 20 μm.

The coating liquid exhibited good coating applicability during the packaging material preparation. The resultant packaging material exhibited a seal strength of 9.4N/15 mm, a residual solvent of 0.6 mg/m², no smell, a good anti-blocking property, and a residual particle percentage of 0.2%, thus exhibiting no problem at all with respect to any of the evaluation items.

Example 10

A packaging material was prepared in the same manner as in Example 1 except for using a 15 μm-thick nylon film as the base layer instead of the 12 μm-thick polyethylene terephthalate film.

The coating liquid exhibited good coating applicability during the packaging material preparation. The resultant packaging material exhibited a seal strength of 18N/15 mm, a residual solvent of 2.3 mg/m², no smell, a good anti-blocking property, and a residual particle percentage of 0.5%, thus exhibiting no problem at all with respect to any of the evaluation items.

TABLE 3

Effects of solvent, anionic surfactant and substrate.

| | Packaging material | | | | | | |
|---|---|---|---|---|---|---|---|
| Example | Coating applicability | Seal strength | Residual solvent | Smell | Anti-blocking | Powder non-adhesion | Overall evaluation |
| Comp. 3 | A | A | C | D | A | A | Not good |
| Comp. 4 | A | A | C | B | A | C | Not good |
| Comp. 5 | A | A | C | C | A | B | Not-good |
| 7 | A | A | A | A | A | A | Good |
| 8 | A | B | A | A | A | A | Good |
| 9 | A | A | A | A | A | A | Good |
| 10 | A | A | A | A | A | A | Good |

In the following Examples, the coating amount of the amorphous polyester resin layer as the surface sealing layer was varied and the influence thereof was evaluated. The results are inclusively shown in Table 4 appearing later.

Comparative Example 6

A laminate structure before the provision of the surface amorphous polyester resin layer and having the lower polyethylene layer as the surface sealing layer was evaluated as a packaging material.

The packaging material exhibited a seal strength of 20N/15 mm, a residual solvent of 0.5 mg/m$^2$, a smell of polyethylene, a good anti-blocking property, and a residual particle percentage of 4.5%.

Example 11

A packaging material was prepared in the same manner as in Example 1 except for changing the coating amount of the amorphous polyester resin aqueous dispersion liquid prepared in Example 1 from 3 g/m$^2$ to 1 g/m$^2$.

The aqueous dispersion liquid exhibited good coating applicability during the packaging material preparation. The resultant packaging material exhibited a seal strength of 8-20N/15 mm, a residual solvent of 1.1 mg/m$^2$, no smell, a good anti-blocking property, and residual particle percentage of 2.0%. The seal strength was fluctuated and the residual particle percentage was increased, whereas these were both within tolerable ranges. No problem was observed with respect to the other items.

Example 12

A packaging material was prepared in the same manner as in Example 1 except for changing the coating amount of the amorphous polyester resin aqueous dispersion liquid prepared in Example 1 from 3 g/m$^2$ to 2 g/m$^2$.

The aqueous dispersion liquid exhibited good coating applicability during the packaging material preparation. The resultant packaging material exhibited a seal strength of 10-25N/15 mm, a residual solvent of 1.1 mg/m$^2$, no smell, a good anti-blocking property, and residual particle percentage of 1.5%. The seal strength was fluctuated and the residual particle percentage was increased, whereas these were both within tolerable ranges. No problem was observed with respect to the other items.

Example 13

A packaging material was prepared in the same manner as in Example 1 except for changing the coating amount of the amorphous polyester resin aqueous dispersion liquid prepared in Example 1 from 3 g/m$^2$ to 4 g/m$^2$.

The aqueous dispersion liquid exhibited good coating applicability during the packaging material preparation. The resultant packaging material exhibited a seal strength of 18N/15 mm, a residual solvent of 1.5 mg/m$^2$, no smell, a good anti-blocking property, and residual particle percentage of 0.3%, thus exhibiting no problem at all with respect to any of the evaluation items.

Example 14

A packaging material was prepared in the same manner as in Example 1 except for changing the coating amount of the amorphous polyester resin aqueous dispersion liquid prepared in Example 1 from 3 g/m$^2$ to 5 g/m$^2$.

The aqueous dispersion liquid exhibited good coating applicability during the packaging material preparation. The resultant packaging material exhibited a seal strength of 8N/15 mm, a residual solvent of 2.3 mg/m$^2$, no smell, a good anti-blocking property, and residual particle percentage of 0.3%, thus exhibiting no problem at all with respect to any of the evaluation items.

Example 15

A packaging material was prepared in the same manner as in Example 1 except for changing the coating amount of the amorphous polyester resin aqueous dispersion liquid prepared in Example 1 from 3 g/m$^2$ to 6 g/m$^2$.

The aqueous dispersion liquid exhibited good coating applicability during the packaging material preparation. The resultant packaging material exhibited a seal strength of 7N/15 mm, a residual solvent of 2.8 mg/m$^2$, no smell, a good anti-blocking property, and residual particle percentage of 0.4%. The seal strength was somewhat lowered but was within a tolerable range, and no problem was observed with respect to the other evaluation items.

Example 16

A packaging material was prepared in the same manner as in Example 1 except for changing the coating amount of the amorphous polyester resin aqueous dispersion liquid prepared in Example 1 from 3 g/m$^2$ to 7 g/m$^2$.

The aqueous dispersion liquid exhibited good coating applicability during the packaging material preparation. The resultant packaging material exhibited a seal strength of 5N/15 mm, a residual solvent of 5.5 mg/m$^2$, no smell, a good anti-blocking property, and residual particle percentage of 0.5%. The seal strength was lowered and the residual solvent was increased, whereas these were within tolerable ranges, and no problem was observed with respect to the other evaluation items.

Reference Example 2

A packaging material was prepared in the same manner as in Example 1 except for changing the coating amount of the amorphous polyester resin aqueous dispersion liquid prepared in Example 1 from 3 g/m$^2$ to 8 g/m$^2$.

The aqueous dispersion liquid exhibited good coating applicability during the packaging material preparation. The resultant packaging material exhibited a seal strength of 3N/15 mm, a residual solvent of 8.5 mg/m$^2$, no smell, a good anti-blocking property, and residual particle percentage of 0.5%. The seal strength and the residual solvent exceeded the tolerable limits.

TABLE 4

Effects of coating amounts (as solid) of the amorphous polyester resin aqueous dispersion liquid.

| Example | Coating amount (g/m2) | Coating applicability | Packaging material | | | | | Overall evaluation |
| --- | --- | --- | --- | --- | --- | --- | --- | --- |
| | | | Seal strength | Residual solvent | Smell | Anti-blocking | Powder non-adhesion | |
| Comp. 6 | 0 | — | A | A | C | A | C | Not good |
| 11 | 1 | A | A | A | A | A | B | Good |
| 12 | 2 | A | A | A | A | A | B | Good |
| 1 | 3 | A | A | A | A | A | A | Good |
| 13 | 4 | A | A | A | A | A | A | Good |
| 14 | 5 | A | A | A | A | A | A | Good |
| 15 | 6 | A | B | A | A | A | A | Good |
| 16 | 7 | A | B | B | A | A | A | Good |
| Ref. 2 | 8 | A | C | C | A | A | A | Not good |

(Evaluation of Surfactants)

Various aqueous liquids were prepared by adding aqueous solutions of various surfactants in amounts of 3-5 wt. % (as solid) of amorphous polyester resin to the same amorphous polyester resin aqueous dispersion liquid as used in Example 1 but before the addition of the anionic surfactant aqueous solution. The aqueous dispersion liquids were respectively applied by hand coating (i.e., without using a coating machine as in the preceding Examples) onto the same laminate structure as in Example 1 having the surfacemost polyethylene layer and before the coating with the amorphous polyester resin layer, and dried in an oven, to prepare various packaging materials.

The coating applicability of the aqueous dispersion liquids and the performances of the resultant packaging materials were evaluated in the same manner as in the preceding Examples. The results are inclusively shown in Table 5 below.

TABLE 5

Effects of various surfactants

| Type | Surfactant | | | Addition amount*1 (wt. %) | Miscibility | Coating applicability | Smell | Seal strength*3 (N/15 mm) | Particle non-adhesion (Residual particle) |
| --- | --- | --- | --- | --- | --- | --- | --- | --- | --- |
| | Trade name (Makers*2) | Main Component | | | | | | | |
| Anionic | EMAL 2F (Kao K. K.) | sodium lauryl sulfate | | 3 | A | A | A | A (20) | A (0.3%) |
| | RLM-45NV (Kao K. K.) | polyoxyethylane alkyl ether acetate | | 3 | A | A | A | A (21) | A (0.3%) |
| cationic | JULIMER SAT-5W | quaternary ammonium salt [α-ethyl(trimethylammonium)] alkaloyl ester | | on-coat | — | A | D soap-like | B (13) | C (7.7%) |
| | | | | 5 | B (gelled) | A | C light | A (19) | C (6.8%) |
| | JULIMER SP-50TF | quaternary ammonium aliphatic type | | on-coat | — | A | C light | B (10) | C (6.5%) |
| | JULIMER SPO-600 | do. | | on-coat | — | A | C light | C (2, 4) | C (2.1%) |
| | JULIMER FC-80 | do. | | on-coat | — | C (repelled) | Not evaluated because of poor coating applicability | | |
| | COATAMINE E-80K (Kao K. K.) | alkoxypropyltrimethyl-ammonium chloride | | 3 | C gelled | Not evaluated because of poor miscibility | | | |
| | ADEKA COL CC-36 (Asahi Denka K. K.) | polyether cation | | 3 | A | C | Not evaluated because of poor coating applicability | | |
| | | | | 5 | A | C (repelled) | | | |
| non-ionic | LEODOL SP-L10 (Kao K. K.) | sorbitan aliphatic ester | | on-coat | — | C (repelled) | Not evaluated because of poor coating applicability | | |
| | LP-20R (Nippon Yushi K. K.) | sorbitan aliphatic ester | | on-coat | — | A | C light | A (19) | C (7.4%) |
| | EMANONE 410 (Kao K. K.) | polyoxyethyleneglycol monooleate | | 3 | A | C | Not evaluated because of poor coating applicability | | |
| | | | | 5 | A | C (repelled) | | | |
| | EMANONE CH25 (Kao K. K.) | polyoxyethylene-hardened castor oil | | 3 | A | C | Not evaluated because of poor coating applicability | | |
| | | | | 5 | A | C (repelled) | | | |

TABLE 5-continued

Effects of various surfactants

| Type | Surfactant | | Addition | | | | Seal | Particle non-adhesion |
| | Trade name (Makers*2) | Main Component | amount*1 (wt. %) | Miscibility | Coating applicability | Smell | strength*3 (N/15 mm) | (Residual particle) |
|---|---|---|---|---|---|---|---|---|
| mpohoteric | ANHITOL 20YB (Kao K. K.) | alkylcarboxymethyl hydroxyethylimidazolium betaine | 3 | A | A | A | A (18) | B (1.3%) |

**Notes to this table appear in the next page.
Notes to Table 5 in the preceding page.
*1"On-coat" in the column of "Addition amount" represents a coating state where an amorphous polyester resin aqueous dispersion liquid not containing the surfactant was first applied, and after drying, a dilute solution in water or alcohol of the surfactant is applied thereover in a thin film.
*2"JULIMER" represents a product from Nippon Jun'yaku K. K.
*3Incidentally, somewhat higher levels of seal strengths are recorded in Table 5 than in the preceding Examples under the same heat-sealing conditions of 150° C., 0.2 MPa and 1.0 sec. This is primarily because the packaging materials in these Examples were dried from two faces owing to the oven drying whereas the packaging materials in the preceding Examples were dried from one-side surfaces.

As described above, the present invention provides a packaging material which is excellent in aroma-retentivity, aroma non-adsorptivity, particulate non-adhesion, low residual solvent and sealability, by coating a substrate successively with a polyolefin layer and an aqueous dispersion liquid-type amorphous polyester resin layer to which an anionic surfactant or an amphoteric surfactant has been added. The packaging material is also free from environmental problem and is therefore suitable as packaging materials for particulate medical supplies and health foodstuff.

What is claimed is:

1. A packaging material, comprising a substrate, and an inner sealing layer comprising a polyolefin layer and an aqueous dispersion-type amorphous polyester resin layer successively disposed on the substrate,
    wherein said aqueous dispersion-type amorphous polyester resin layer contains an anionic surfactant or an amphoteric surfactant and an organic solvent,
    wherein said aqueous dispersion-type amorphous polyester resin layer is substantially free from an organic solvent having a boiling point of at most 100° C., as represented by a residual solvent content of below 8 mg/m$^2$ measured according to an evaporation test at 80° C.,
    wherein said acqueous dispersion-type amorphous polyester resin layer comprises a combination of an amorphous polyester resin having a glass transition temperature of at least 40° C. and an amorphous polyester resin having a glass transition temperature below 40° C.,
    wherein the packaging material is in the form of a bag.

2. The packaging material according to claim 1, wherein said substrate comprises at least an oxygen and/or moisture barrier layer, and a base layer, below the polyolefin layer.

3. The packaging material according to claim 2, wherein the barrier layer comprises at least one selected from the group consisting of aluminum foil, ethylene-vinyl alcohol copolymer layer, vapor deposited film of inorganic material, and polypropylene film.

4. The packaging material according to claim 2, wherein the base layer comprises at least one selected from the group consisting of paper, cellophane, polyester, nylon and polypropylene.

5. The packaging material according to claim 1, wherein said anionic surfactant comprises an alkyl sulfate-type or a polyoxyethylene alkyl ether acetate-type anionic surfactant.

6. The packaging material according to claim 1, wherein the amorphous polyester resin layer is formed on the polyolefin layer via an anchor coating layer.

7. A packaging product, comprising: the packaging material according to claim 1, and a particulate medical supply or a health foodstuff sealed up in the packaging material.

8. The packaging material according to claim 3, wherein the base layer comprises at least one selected from the group consisting of paper, cellophane, polyester, nylon and polypropylene.

9. The packaging material according to claim 2, wherein said anionic surfactant comprises an alkyl sulfate-type or a polyoxyethylene alkyl ether acetate-type anionic surfactant.

10. The packaging material according to claim 3, wherein said anionic surfactant comprises an alkyl sulfate-type or a polyoxyethylene alkyl ether acetate-type anionic surfactant.

11. The packaging material according to claim 4, wherein said anionic surfactant comprises an alkyl sulfate-type or a polyoxyethylene alkyl ether acetate-type anionic surfactant.

12. The packaging material according to claim 2, wherein the amorphous polyester resin layer is formed on the polyolefin layer via an anchor coating layer.

13. The packaging material according to claim 3, wherein the amorphous polyester resin layer is formed on the polyolefin layer via an anchor coating layer.

14. The packaging material according to claim 4, wherein the amorphous polyester resin layer is formed on the polyolefin layer via an anchor coating layer.

15. The packaging material according to claim 5, wherein the amorphous polyester resin layer is formed on the polyolefin layer via an anchor coating layer.

16. A packaging product, comprising: the packaging material according to claim 2, and a particulate medical supply or a health foodstuff sealed up in the packaging material.

17. A packaging product, comprising: the packaging material according to claim 3, and a particulate medical supply or a health foodstuff sealed up in the packaging material.

18. A packaging product, comprising: the packaging material according to claim 4, and a particulate medical supply or a health foodstuff sealed up in the packaging material.

19. A packaging product, comprising: the packaging material according to claim 5, and a particulate medical supply or a health foodstuff sealed up in the packaging material.

20. A packaging product, comprising: the packaging material according to claim 6, and a particulate medical supply or a health foodstuff sealed up in the packaging material.

21. A packaging product, comprising a bag of a packaging material and a particulate medical supply sealed up in the bag, wherein the packaging material comprises a substrate, and an inner sealing layer comprising a polyolefin layer and an aqueous dispersion-type amorphous polyester resin layer successively disposed on the substrate, wherein said aqueous dispersion-type amorphous polyester resin layer contains an anionic surfactant or an amphoteric surfactant and an organic solvent, wherein said aqueous dispersion-type amorphous polyester resin layer is substantially free from an organic solvent having a boiling point of at most 100° C., as represented by a residual solvent content of below 8 mg/m$^2$ measured according to an evaporation test at 80° C., wherein said aqueous dispersion-type amorphous polyester resin layer comprises a combination of an amorphous polyester resin having glass transition temperature of at least 40° C. and an amorphous polyester resin having a glass transition temperature below 40° C.

22. The packaging product according to claim 21, wherein the particulate medical supply has a diameter of at most 3 mm.

23. The packaging product according to claim 21, wherein the particulate medical supply comprises spherical adsorptive carbon particles.

* * * * *